United States Patent [19]

Schütz et al.

[11] Patent Number: 4,514,187
[45] Date of Patent: Apr. 30, 1985

[54] PROCESS FOR DYEING DIFFERENTIAL-DYEING POLYAMIDE FIBRES

[75] Inventors: Hans U. Schütz, Basle; Helmut Raisin, Riehen; Th's Bouwknegt, Reinach, all of Switzerland

[73] Assignee: Ciba-Geigy Corporation, Ardsley, N.Y.

[21] Appl. No.: 513,596

[22] Filed: Jul. 14, 1983

[30] Foreign Application Priority Data

Jul. 21, 1982 [CH] Switzerland ............... 4450/82

[51] Int. Cl.³ ............... C09B 1/34; D06P 3/06
[52] U.S. Cl. ............... 8/531; 8/641; 8/643; 8/676; 8/679; 8/924; 260/370; 260/374; 260/371
[58] Field of Search ............... 8/531, 643, 676, 679; 260/194, 370, 371, 374

[56] References Cited

U.S. PATENT DOCUMENTS

| | | | |
|---|---|---|---|
| 1,927,125 | 9/1933 | Kallisher et al. | 260/372 |
| 2,122,798 | 7/1938 | Kränzlein et al. | 260/372 |
| 2,713,059 | 7/1955 | Günthard | 260/194 |
| 2,952,690 | 8/1980 | Riat | 260/372 |
| 3,117,117 | 1/1964 | Berrie et al. | 260/162 |
| 3,391,134 | 7/1968 | Kuhne et al. | 8/436 |
| 3,511,826 | 5/1970 | Doninique et al. | 260/146 R |
| 3,755,379 | 8/1973 | Riat et al. | 8/676 |
| 3,778,453 | 12/1973 | Hindermann et al. | 260/374 |
| 3,802,836 | 4/1974 | Speck | 8/641 |
| 4,146,363 | 3/1979 | Harms et al. | 260/374 |
| 4,188,187 | 2/1980 | Mislin et al. | 8/676 |
| 4,213,759 | 7/1980 | Ridyard et al. | 8/676 |

FOREIGN PATENT DOCUMENTS

| | | |
|---|---|---|
| 1110959 | 10/1954 | France . |
| 913900 | 12/1962 | United Kingdom . |
| 1017616 | 1/1966 | United Kingdom . |
| 1140998 | 1/1969 | United Kingdom . |
| 1357934 | 6/1974 | United Kingdom . |
| 1485438 | 9/1977 | United Kingdom . |
| 1557669 | 12/1979 | United Kingdom . |

OTHER PUBLICATIONS

Bird and Boston, The Theory of Coloration of Textiles, p. 151.
Venkataraman, The Chemistry of Synthetic Dyes, vol. IV, p. 55.

Primary Examiner—A. Lionel Clingman
Attorney, Agent, or Firm—Edward McC. Roberts; Kevin T. Mansfield

[57] ABSTRACT

The present invention relates to a process for the differential dyeing of such polyamide fibres and materials containing polyamide fibres as are made of components which differ in dyeability, or mixtures of polyamide fibres, with dyes or dye mixtures, which comprises using for dyeing these materials an aqueous liquor which contains a dye of the formula

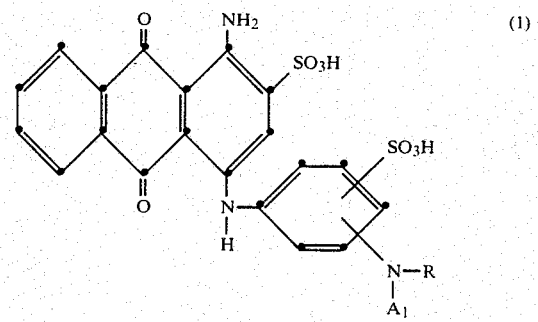

in which $A_1$ is hydrogen or $C_{1-4}$alkyl and R is a $C_{2-5}$-alkanoyl, $C_{3-6}$-alkenoyl, ($C_{1-4}$-alkoxy)carbonyl, phenoxycarbonyl, $C_{1-4}$-alkylsulfonyl or phenylsulfonyl radical which can be substituted in the alkyl, alkenyl, alkoxy, phenoxy or phenyl moiety, or a mixture of a dye of the formula (1) with a monosulfo-containing anthraquinone dye, and to those dyes of the formula (1) in which $A_1$ is as defined above and R is a $C_{1-4}$-alkylsulfonyl or phenylsulfonyl radical which can be substituted in the phenyl moiety by $C_{1-4}$-alkyl.

Even at low dyeing temperatures, the process of the invention gives ombré effects rich in contrast and, on admixture of other suitable acid dyes, multicolor effects on polyamide fibres which are suitable for differential dyeing.

33 Claims, No Drawings

PROCESS FOR DYEING DIFFERENTIAL-DYEING POLYAMIDE FIBRES

The present invention relates to a novel process for dyeing differential-dyeing fibres made of polyamide fibre material and materials containing polyamide fibres, with disulfo-containing anthraquinone dyes or dye mixtures which contain a disulfoanthraquinone dye.

Differential dyeing is to be understood as meaning the dyeing of piece goods made of fibres which are of the same chemical type but which differ in affinity for the dye, and as a result multicoloured articles, for example, are obtained by means of a single dyebath.

It is possible to dye polyamide fibres and materials containing polyamide fibres by customary dyeing or printing methods, for example by printing with print pastes which differ in dye concentration, in such a way that a multicolour or light-dark effect is obtained, but these methods are technically rather complicated.

The object of the present invention is to simplify the customary dyeing and printing methods as regards the multicolour effect and the light-dark effect so as to obtain coloured patterns rich in contrast, and to provide dyes which are suitable for the differential dyeing of polyamide fibres. It is a prerequisite of the novel dyeing process that multicolour or light-dark effects are obtained by using such polyamide fibres or materials containing polyamide fibres as consist of mixtures of different polyamide fibre types which differ from one another by the number of terminal amino groups and which can thus be dyed with acid dyes to different depths of shade.

It is a disadvantage of many known dyes which are available that, for example, adjacent fibres are stained, that the dyes are sensitive to changes of the dyebath pH or that a uniform build-up of colour necessitates long residence times in a dyebath at the boil.

It was found, then, that the process described below is free of these disadvantages. The novel process produces, in particular, uniform exhaustion even in dyeing below the boil within a pH range which is wider than that of existing processes.

The present invention thus provides a process for the differential dyeing of such polyamide fibres and materials containing polyamides fibres as are made of components which differ in dyeability, or mixtures of polyamide fibres (differential-dyeing polyamide fibres) with dyes or dye mixtures, which comprises using for dyeing these materials an aqueous liquor which contains a dye of the formula

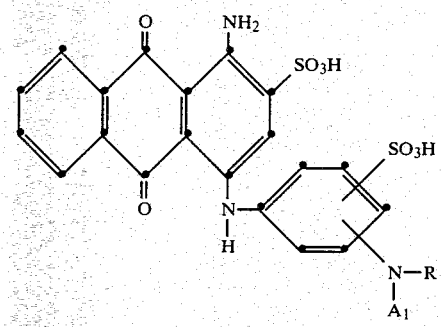

(1)

in which $A_1$ is hydrogen or $C_{1-4}$-alkyl and R is a $C_{2-5}$-alkanoyl, $C_{3-6}$-alkenoyl, $(C_{1-4}$-alkoxy)carbonyl, phenoxycarbonyl, $C_{1-4}$-alkylsulfonyl or phenylsulfonyl radical which can be substituted in the alkyl, alkenyl, alkoxy, phenoxy or phenyl moiety, or a mixture of a dye of the formula (1) with a monosulfo-containing anthraquinone dye.

An alkyl radical $A_1$ in the formula (1) can be a straight-chain or branched alkyl radical, for example the methyl, ethyl, propyl, isopropyl, butyl, sec.-butyl, isobutyl or tert.-butyl radical.

A $C_{2-5}$-alkanoyl radical R can be a straight-chain or branched radical which can also be substituted, for example by halogen, such as fluorine, chlorine and bromine. Examples are acetyl, chloroacetyl, propionyl, butyryl, β-chloropropionyl, β-bromopropionyl and α,β-dibromopropionyl.

A $C_{3-6}$-alkenoyl radical R can be, for example, the acryloyl, 2- or 3-butenoyl, 2-, 3- or 4-pentenoyl or the 4-methyl-2-pentenoyl radical, which can also be substituted, for example by halogen, such as fluorine, chlorine and bromine. Examples are the β-chloroacryloyl radical and the α-bromoacryloyl radical.

A $(C_{1-4}$-alkoxy)carbonyl radical R can be, for example, the methoxycarbonyl, ethoxycarbonyl, isopropoxycarbonyl, propoxycarbonyl or butoxycarbonyl radical, which can also be substituted, for example by halogen, such as fluorine, chlorine and bromine. An example is the 3-chloropropoxycarbonyl radical.

A phenoxycarbonyl radical R can be a radical which is unsubstituted in the phenyl ring or substituted, for example by halogen, such as fluorine, chlorine and bromine, $C_{1-4}$-alkyl, such as methyl, ethyl, propyl, isopropyl, butyl and isobutyl, and $C_{1-4}$-alkoxy, such as methoxy, ethoxy, propoxy, isopropoxy, butoxy and tert.-butoxy.

A $C_{1-4}$-alkylsulfonyl radical R can be for example a methylsulfonyl, ethylsulfonyl, propylsulfonyl, isopropylsulfonyl, butylsulfonyl or sec.-butylsulfonyl radical.

A phenylsulfonyl radical R can be a radical which is unsubstituted in the phenyl ring or substituted, for example by halogen, such as fluorine, chlorine and bromine, $C_{1-4}$-alkyl, such as methyl, ethyl, propyl, isopropyl, butyl and tert.-butyl, and $C_{1-4}$-alkoxy, such as methoxy, ethoxy, propoxy, isopropoxy, butoxy and tert.-butoxy.

Important versions of the process comprise (a) using a dye of the formula (1) in which R is acetyl, chloroacetyl, propionyl, β-chloropropionyl, β-bromopropionyl, acryloyl, methoxycarbonyl, ethoxycarbonyl, phenoxycarbonyl, methylsulfonyl, phenylsulfonyl or methylphenylsulfonyl;

(b) using a mixture of a dye of the formula (1) with a dye of the formula

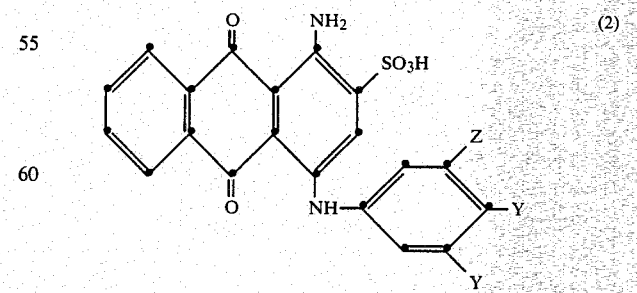

(2)

in which one Y is hydrogen or methyl and the other Y is $C_{2-4}$-alkanoylamino or $C_{2-4}$-hydroxyalkylsulfamoyl, and Z is hydrogen or methyl, the ratio of dyes of the formulae (1) and (2) being preferably 99:1 to 70:30 and, in particular, 90:10 to 80:20;

(c) using a dye of the formula

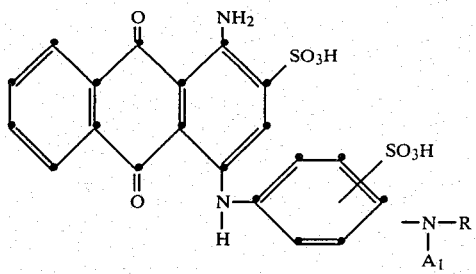 (3)

in which $A_1$ is hydrogen, methyl or ethyl and R is as defined above under (a).

Preferred versions of the process comprise (d) using a dye of the formula

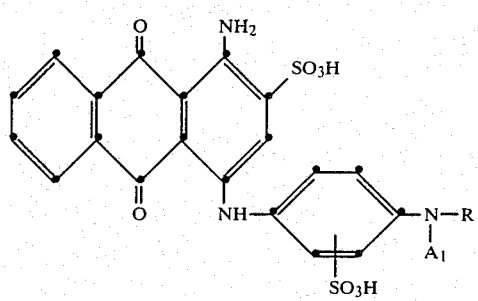 (4)

in which $A_1$ is hydrogen or methyl and R is as defined above under (a). In the formula (4) R is preferably acetyl, chloroacetyl, propionyl, β-chloropropionyl, β-bromopropionyl, acryloyl, methylsulfonyl, phenylsulfonyl or p-methylphenylsulfonyl. In particular, use is made of dyes of the formula (4) in which $A_1$ is hydrogen and R is phenylsulfonyl or p-methylphenylsulfonyl; and (e) using a mixture of dyes of the formulae

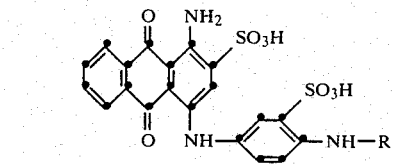 (5)

and

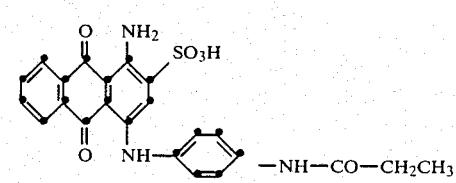 (6)

where, in the formula (5), R is acetyl, p-methylphenylsulfonyl or phenylsulfonyl.

Likewise preferred versions of the process comprise (f) using a dye of the formula (1) in which $A_1$ is hydrogen; and (g) using a dye of the formula (1) in which R is $C_{1-4}$-alkylsulfonyl or phenylsulfonyl radical which can be substituted in the phenyl moiety.

A likewise preferred version of the process comprises using a dye of the formula (1) or a mixture of a dye of the formula (1) with a monosulfo-containing anthraquinone dye, for example a dye of the formula (2), together with acid dyes suitable for normal polyamide fibres.

A large number of known acid dyes, in particular monosulfo-containing dyes, can be used as acid dyes suitable for normal polyamide fibres. In particular, use is made of at least one yellow or orange dye and/or at least one red dye. The yellow or orange dye used is preferably at least one dye of the formula.

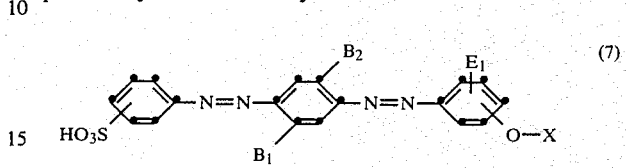 (7)

in which $B_1$, $B_2$ and $E_1$ are hydrogen, $C_{1-4}$-alkyl or $C_{1-4}$-alkoxy and X is straight-chain or branched $C_{1-4}$-alkyl or straight-chain or branched $C_{2-4}$-hydroxyalkyl.

The red dye used is preferably at least one dye of the formula

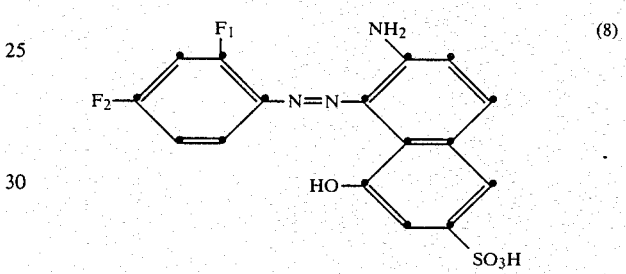 (8)

in which $F_1$ is hydrogen, substituted or unsubstituted $C_{1-4}$-alkyl,

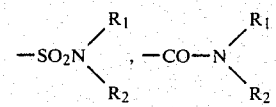

or $-SO_2R_3$ in which $R_1$ is $C_{1-4}$-alkyl, $R_2$ is substituted or unsubstituted $C_{5-7}$-cycloalkyl or substituted or unsubstituted phenyl, and $R_3$ is substituted or unsubstituted phenyl or substituted or unsubstituted phenoxy, and $F_2$ is hydrogen, halogen, $C_{2-4}$-alkanoylamino, $C_{5-8}$-cycloalkoxycarbonylamino, $C_{1-4}$-alkoxycarbonylamino, $C_{1-4}$-alkylsulfonylamino or substituted or unsubstituted phenylsulfonylamino.

Alkyl radicals possible for use as $B_1$, $B_2$, $E_1$, $F_1$, $R_1$ and X in the formulae (7) and (8) are, independently of one another, straight-chain or branched alkyl radicals, for example methyl, ethyl, propyl, isopropyl, butyl, sec.-butyl, isobutyl or tert.-butyl.

An alkyl radical $F_1$ can be substituted, for example by halogen, such as chlorine or bromine and in particular fluorine, and an alkyl radical $F_1$ is preferably a $C_{1-4}$-perfluoroalkyl radical, in particular the trifluoromethyl radical.

A $C_{5-7}$-cycloalkyl radical $R_2$ can be for example the cyclohexyl radical or an alkyl-substituted, such as methyl-substituted, cyclohexyl radical.

Substituted or unsubstituted phenyl radicals $R_2$ and $R_3$ can be $C_{1-4}$-alkyl-, $C_{1-4}$-alkoxy- or halogen-substituted phenyl radicals; $R_2$ or $R_3$ is preferably an unsubstituted phenyl radical.

A substituted or unsubstituted phenoxy radical $R_3$ can be a $C_{1-4}$-alkyl-, in particular methyl-, $C_{1-4}$-alkoxy- or halogen-, in particular chlorine-, substituted phenoxy radical; a phenoxy radical $R_3$ is preferably an unsubstituted or chlorine-substituted phenoxy radical.

A halogen $F_2$ in the formula (8) can be fluorine or bromine and in particular chlorine.

A $C_{2-4}$-alkanoylamino $F_2$ in the formula (8) can be for example the acetylamino, propionylamino or butyrylamino radical.

A $C_{5-8}$-cycloalkoxycarbonylamino $F_2$ can be in particular the cyclohexyloxycarbonylamino radical.

A $C_{1-4}$-alkylsulfonylamino $F_2$ can be a methylsulfonylamino, ethylsulfonylamino, propylsulfonylamino, isopropylsulfonylamino, butylsulfonylamino, tert.-butylsulfonylamino, isobutylsulfonylamino or sec.-butylsulfonylamino radical.

A phenylsulfonylamino radical $F_2$ can be a $C_{1-4}$-alkyl-, $C_{1-4}$-alkoxy- or halogen-substituted phenylsulfonylamino radical, preferably an unsubstituted or methyl-substituted phenylsulfonylamino radical.

Alkoxy radicals $B_1$, $B_2$ and $E_1$ in the formula (7) can be for example methoxy, ethoxy, propoxy, isopropoxy, butoxy, sec.-butoxy, isobutoxy or tert.-butoxy radicals.

A hydroxyalkyl radical X in the formula (7) can be a straight-chain or branched hydroxyalkyl radical, for example the $\beta$-hydroxyethyl, $\beta$-hydroxypropyl, $\beta$-hydroxybutyl or the $\alpha$-ethyl-$\beta$-hydroxyethyl radical.

In particular, use is made of at least one red dye of the formula (8) in which $F_1$ is trifluoromethyl, N-methyl-N-cyclohexylsulfamoyl or N-ethyl-N-phenylsulfamoyl and $F_2$ is hydrogen, chlorine or acetylamino.

The dyes or dye mixtures of the formulae (1), (2), (7) and (8) mentioned above for use in the process of the invention represent the three primary colours, namely blue, yellow or orange, and red, and they can be mixed with one another to produce any shade of the visible colour spectrum through a suitable choice of the ratios of these dyes, the pattern or multicolour effect being determined by the nature and amount of the differential-dyeing polyamide fibers used.

In trichromatic dyeing, in particular, use is made of a dye of the formula (1) or a mixture of dyes of the formulae (1) and (2) with at least one dye of the formula (7) and at least one dye of the formula (8) in which $F_1$ and $F_2$ have the abovementioned preferred definitions.

In particular, the dye of the formula (7) used is the dye of the formula

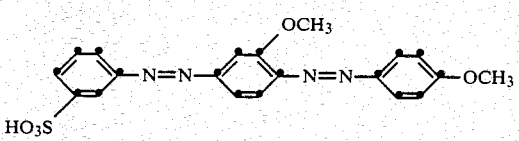

(9)

and the dye of the formula (8) used is the dye of the formula

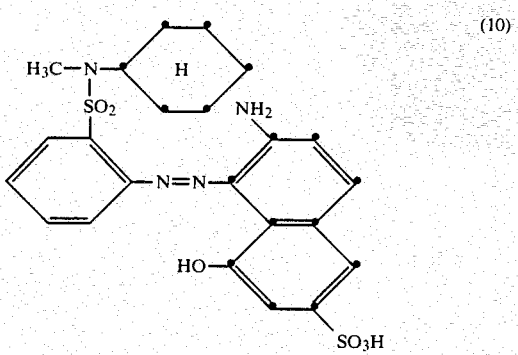

(10)

in particular together with a dye of the formula (4) in which $A_1$ is hydrogen or methyl and R is acetyl, chloroacetyl, propionyl, $\beta$-chloropropionyl, $\beta$-bromopropionyl, acryloyl, phenylsulfonyl, methylsulfonyl or p-methylphenylsulfonyl, or together with a mixture of dyes of the formulae (4) and (6) where, in the formula (4), $A_1$ is hydrogen and R is acetyl or phenylsulfonyl.

Some of the dyes used in the dyeing process of the invention are known. Dyes of the formula

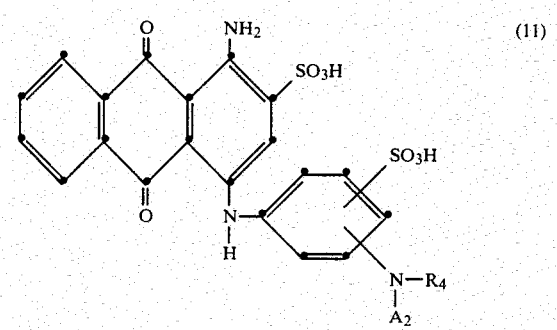

(11)

in which $A_2$ is hydrogen or $C_{1-4}$-alkyl and $R_4$ is $C_{1-4}$-alkylsulfonyl or phenylsulfonyl radical which can be substituted in the phenyl moiety by $C_{1-4}$-alkyl, are novel and form part of the subject-matter of the invention. Those dyes of the formula (11) are preferred in which (a) $A_2$ is hydrogen;
(b) $R_4$ is phenylsulfonyl or methylphenylsulfonyl; and
(c) the —$N(A_2)R_4$ radical is bonded in m— and, in particular, in p-position relative to the N—H group of the phenylamino radical.

Particularly preferred dyes have the formulae

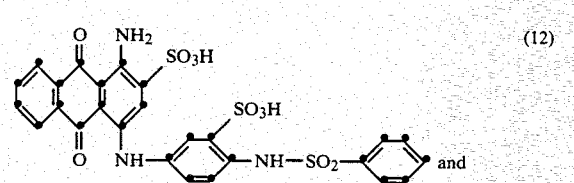

(12)

and

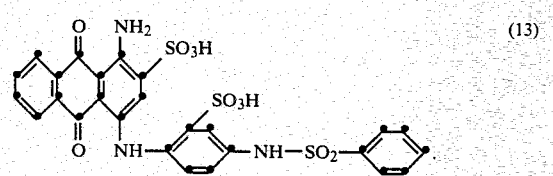

(13)

The dyes of the formula (1) and (11) are prepared by acylating a compound of the formula

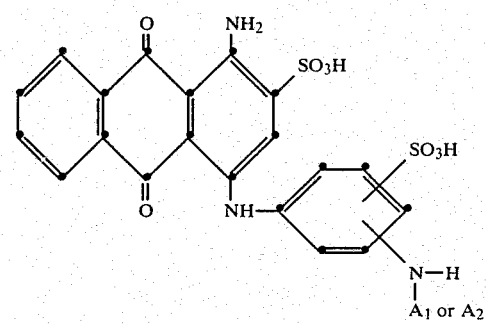

in which $A_1$ and $A_2$ are as defined above, with a compound which introduces the R or $R_4$ radical.

In particular, use is made of a compound of the formula (14) in which $A_2$ is hydrogen; and the acylating agent used is a compound which introduces the phenylsulfonyl or methylphenylsulfonyl radical $R_4$.

The particularly preferred dyes of the formulae (12) and (13) are prepared by reacting 1-amino-4-(3'- or 2'-sulfo-4'-aminophenylamino)anthraquinone-2-sulfonic acid with phenylsulfonyl chloride.

Examples of compounds introducing a R or $R_4$ radical are acetyl chloride, chloroacetyl chloride, acetic anhydride, propionic anhydride, propionyl chloride, butanecarbonyl chloride, acryloyl chloride, methanesulfonyl chloride, benzenesulfonyl chloride, p-methylbenzenesulfonyl chloride and β-chloropropionyl or β-bromopropionyl chloride.

The acylation is preferably effected in an aqueous solution or suspension at a weakly alkaline to neutral pH.

Dyes of the formula (2) can be prepared, for example, by following the instructions of U.S. Pat. Nos. 3,778,453, 1,972,125 and 4,146,363, and dyes of the formula (8) by following the instructions of German Pat. Nos. 702,932 and 2,063,907 and German Offenlegungsschrift No. 2,712,170, and dyes of the formula (7) by following the instructions of German Offenlengungsschrift No. 2,142,412.

Dye mixtures for use in the process of the invention can be prepared by mixing the individual dyes, for example in suitable mills, for example ball mills and pinned-disc mills, as well as in kneaders or mixers. The dye mixtures of the dyes can also be prepared by spray-drying the aqueous dye mixtures.

The dyes used in the process of the invention are either in the form of their free sulfonic acid or, preferably, in the form of its salts.

Examples of possible salts are the alkali metal, alkaline earth metal or ammonium salts and the salts of an organic amine. Examples are the sodium, lithium, potassium or ammonium salts and the salt of triethanolamine.

The dyes used in the process of the invention usually contain further additives, for example sodium chloride or dextrin.

The dyeing process of the invention can be applied to the customary dyeing methods. The dyeing liquors, in addition to water and the dyes, can contain further additives, for example wetting agents, antifoams, levelling agents or agents which affect a property of the textile material, for example softeners, flameproofing additives or soil-, water- and oil-repellant agents, and water-softening agents and natural or synthetic thickeners, for example alginates and cellulose ethers.

The process of the invention is particularly suitable for dyeing from short liquors, for example in continuous dyeing methods or discontinuous and continuous foam-dyeing methods.

The dyeing temperature is, as a rule, 50° to 100° C., preferably 70° to 96° C., but a temperature as low as 70° C. is sufficient to give satisfactory results.

The polyamide fibres and materials containing polyamide fibres which can be used in the process of the invention are preferably synthetic polyamide fibres, for example in the form of woven or knitted fabrics and in particular carpet materials made of differential-dyeing fibre types of nylon 6, nylon 66 and nylon 11 fibres which differ in the number of terminal amino groups. In the case of these polyamide fibres which are suitable for differential dyeing a distinction is made between fibre types referred to as non-dyeable, pale-dyeable, normal-dyeable and deep-dyeable with acid dyes.

It is also possible to use fibre blends of the above-mentioned polyamide fibre types with other natural and/or sythetic fibre materials, for example polyester, polyacrylonitrile and cellulosic fibres.

The dyes of the formula (1) used in the process of the invention produce, on the polyamide fibre types which differ in dyeability, striking colour contrasts in blue shades between various types of fibre. It is also possible to vary the contrast effect, for example by using dye mixtures of dyes of the formulae (1) and (2). In the process of the invention it is also possible to use dyes of the formula (1) or dye mixtures of dyes of the formulae (1) and (2) at the same time as dyes of other types, such as disperse, basic or neutral-dyeing acid dyes, for example the dyes of the above formulae (7) and (8), to obtain fashionable multicolour effects.

The dye of the formula (1) used in the process of the invention differentiates very well in the depth of shade as it builds up well on the various polyamide fibre types described above, in particular even at low dyeing temperatures and within a wide pH range, and it can be combined with other dyes without access to the dye-sites on the fibre being blocked.

In the examples which follow parts are parts by weight. The temperatures are given in degrees centigrade. Parts by weight relate to parts by volume as the gram relates to the cubic centimeter.

In the following examples, the deep-dyeable polyamide fibre used is for example a fibre supplied by du Pont under the name type 847 nylon 66, the normal-dyeable polyamide fibre used is, for example, a fibre supplied byr du Pont under the name of type 846 nylon 66, and the pale-dyeable polyamide fibre used is, for example, a fibre supplied by du Pont under the name of type 845 nylon 66.

EXAMPLE 1

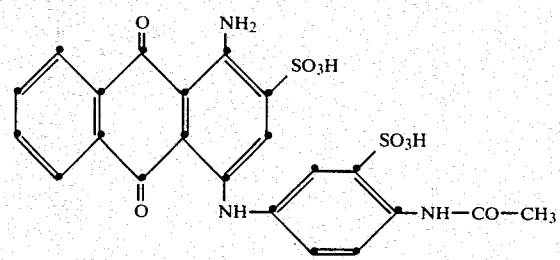

48.9 parts of 1-amino-4-(4'-aminophenylamino-3'-sulfonic acid)anthraquinone-2-sulfonic acid are dissolved in 175 parts of hot water at pH 8–8.5 by means of sodium hydroxide solution, and, at about 45°, the solution is admixed with 12.8 parts of acetic anhydride and vigorously stirred for about 30 minutes. The dye has been completely acetylated and is in solution. The dye is precipitated by adding sodium chloride, is filtered off with suction and is dried. This gives 65 parts of a dye powder which gives a blue solution in water. The dye has the structure shown above. Polyamide materials and wool are dyed in blue shades having good all-round fastness properties.

EXAMPLE 2

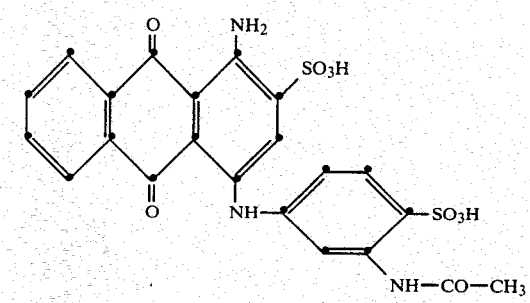

48.9 parts of 1-amino-4-(3'-aminophenylamino-4'-sulfonic acid)anthraquinone-2-sulfonic acid are dissolved in 400 parts of hot water at pH 7–8 by means of sodium hydroxide solution, and, at 50°, the solution is admixed with 30 parts of acetic anhydride and vigorously stirred for about 30 minutes. The dye has been completely acetylated and is in solution. The dye is precipitated by adding about 20% of sodium chloride, is filtered off with suction and is dried. This gives 120 parts of a dye powder. The dye has the structure shown above, and dyes polyamide materials and wool in blue shades.

EXAMPLE 3

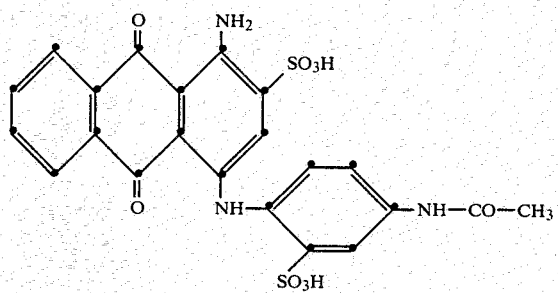

48.9 parts of 1-amino-4-(4'-aminophenylamino-2'-sulfonic acid)anthraquinone-2-sulfonic acid are dissolved in 200 parts of hot water at pH 7–8 by means of sodium hydroxide solution, and, at 45°, the solution is admixed with 10.3 parts of acetic anhydride and vigorously stirred for 30 minutes. The dye has been completely acetylated and some of it has precipitated. The dye is completely precipitated by adding 5% of sodium chloride, is filtered off with suction and is dried. This gives 53.5 parts of a dye powder. The dye has the structure shown above, and dyes polyamide materials and wool in blue shades.

EXAMPLE 4

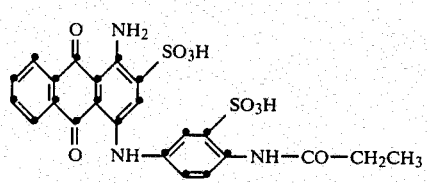

48.9 parts of 1-amino-4-(4'-aminophenylamino-3'-sulfonic acid)anthraquinone-2-sulfonic acid are dissolved in 200 parts of hot water at pH 7–8 by means of sodium hydroxide solution, and the solution is admixed at 50° with 30 parts of propionic anhydride and stirred vigorously for 2 hours. The dye has been completely acetylated and is in solution. The solution is then neutralised with sodium hydroxide solution, and the dye is precipitated with 17.5% of sodium chloride, is filtered off with suction and is dried. This gives 68 parts of dye powder. The dye has the structure shown above and dyes polyamide materials and wool in blue shades.

EXAMPLE 5

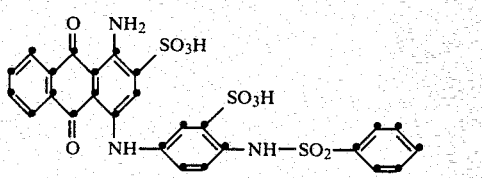

48.9 parts of 1-amino-4-(4'-aminophenylamino-3'-sulfonic acid)anthraquinone-2-sulfonic acid are dissolved in 200 parts of hot water at pH 7–8 by means of sodium hydroxide solution, and, at 40°, the solution is admixed with 35 parts of benzenesulfonyl chloride and is stirred vigorously for some hours, during which the pH is maintained at 7–8 by the dropwise addition of dilute sodium hydroxide solution. The dye has been completely benzenesulfonylated and virtually all of it has precipitated. Filtering off with suction and drying gives 80 parts of a dye powder. The dye has the structure shown above and dyes polyamide materials and wool in blue shades.

Further dyes having similar properties are obtained anlogously by acylating the base dyes given in column I of Table 1 below by means of the acylating agents listed in column II. These dyes dye polyamide and wool in the shades given in column III.

TABLE 1

| Example | I | II | III |
|---------|---|----|-----|
| 6 | 1-amino-4-[(4-amino-3-sulfophenyl)amino]-9,10-dioxoanthracene-2-sulfonic acid (anthraquinone with NH₂, SO₃H, and NH-phenyl(SO₃H)(NH₂) substituents) | CH₃—SO₂Cl | blue |
| 7 | 1-amino-4-[(4-amino-3-sulfophenyl)amino]-9,10-dioxoanthracene-2-sulfonic acid | CH₃—C₆H₄—SO₂Cl | blue |
| 8 | 1-amino-4-[(3-amino-4-sulfophenyl)amino]-9,10-dioxoanthracene-2-sulfonic acid | C₆H₅—SO₂Cl | blue |
| 9 | 1-amino-4-[(4-amino-2-sulfophenyl)amino]-9,10-dioxoanthracene-2-sulfonic acid | C₆H₅—SO₂Cl | blue |
| 10 | 1-amino-4-[(4-amino-2-sulfophenyl)amino]-9,10-dioxoanthracene-2-sulfonic acid | CH₃—C₆H₄—SO₂Cl | blue |

TABLE 1-continued

| Example | I | II | III |
|---|---|---|---|
| 11 | (anthraquinone structure with NH₂, SO₃H, NH-phenyl-NH₂, SO₃H) | CH₂=CH—COCl | blue |
| 12 | (anthraquinone structure with NH₂, SO₃H, SO₃H, NH-phenyl-NH₂) | ClCH₂—COCl | blue |
| 13 | (anthraquinone structure with NH₂, SO₃H, NH-phenyl-NH₂, SO₃H) | (CH₃—CH₂—CO)₂O | blue |
| 14 | (anthraquinone structure with NH₂, SO₃H, NH-phenyl-NH—CH₃, SO₃H) | (CH₃—CH₂—CO)₂O | blue |

EXAMPLE 15

10 parts of a nylon carpet material made of nylon fibre types referred to as normal-, deep- and pale-dyeable with acid dyes are dyed in 500 parts of an aqueous liquor which contains per liter 1 g of ammonium acetate and 1.5% of non-ionic levelling assistant based on a polyethoxylated $C_{20-22}$-fatty amine and is adjusted to pH 4.5 by means of 80% acetic acid. The dyes used are 0.24% of the yellow dye of the formula (9)

(azo dye structure: HO₃S—phenyl—N=N—phenyl(OCH₃)—N=N—phenyl—OCH₃)

0.12% of the red dye of the formula and 0.15% of the blue dye of the formula

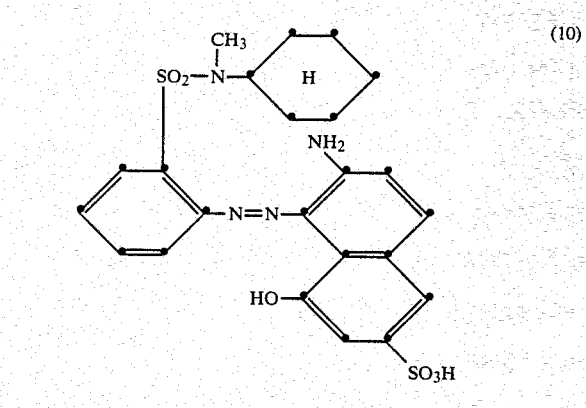

(10)

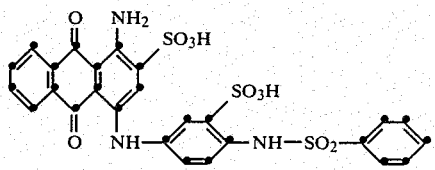

where the quantities are based on weight of fibre. The dyeing liquor is maintained at room temperature for 20 minutes and is then heated to 70° in the course of 45 minutes. Dyeing is carried out at 70° for 60 minutes. The dyed nylon carpet material is then taken out of the bath and conventionally rinsed and dried. This gives a pattern on the nylon carpet material which is rich in contrast and in which the fibre type labelled pale-dyeable is virtually colourless, the fibre type labelled normal-dyeable has been dyed an orange-red shade and the fibre type labelled deep-dyeable has been dyed a brown shade. The dyeings have generally good fastness properties.

EXAMPLE 16

10 parts of a nylon carpet material made of a fibre type labelled normal-dyeable, a fibre type labelled deep-dyeable and a fibre type labelled pale-dyeable are dyed in 500 parts of an aqueous liquor which contains per liter 1.5 g of ammonium acetate and 1.5% of a non-ionic levelling assistant described in more detail in Example 15 and which is adjusted to pH 5.5 by means of 80% acetic acid. The dyes used are 0.24% of the yellow dye of the formula (9), 0.12% of the red dye of the formula (10) and 0.15% of the blue dye of the formula (12) of Example 15, where the quantities are based on weight of fibre. The dyeing liquor is held at room temperature for 10 minutes and is then heated to 96° in the course of 45 minutes. Dyeing is carried out at 96° for 60 minutes. The liquor is then allowed to cool down to 70°, and the dyed nylon carpet material is taken out and conventionally rinsed and dried. This gives a pattern on the nylon carpet material which is rich in contrast and of the type described in more detail in Example 15.

EXAMPLE 17

1,000 parts of an aqueous solution which contains per liter 0.48 g of the yellow dye of the formula (9), 0.24 g of the red dye of the formula (10) and 0.3 g of the blue dye of the formula (12) of Example 15 as well as 3 g of a thickener based on carob bean flour, 1.5 g of a foaming agent which consists of 45 parts of $C_{12}H_{25}O(CH_2-CH_2O)_2-SO_3Na$, 45 parts of $C_{11}H_{23}CON(CH_2CH_2OH)_2$ and 10 parts of isopropanol, 1 g of ammonium acetate and 0.2 g of a water-softening agent based on polyphosphate are brought to pH 4.5 by means of acetic acid. 500% of this liquor, based on the weight of the carpet, are applied to an ecru nylon carpet made of a nylon fibre type labelled normal-dyeable, a nylon fibre type labelled deep-dyeable and a nylon fibre type labelled pale-dyeable with acid dyes, and prewetted beforehand with a solution containing per liter 1 g of the reaction product of 1 mol of nonylphenol with 9 mols of ethylene oxide and then suction-extracted down to a residual moisture content of 100%. The impregnated carpet passes into a loop steamer, where it is treated with saturated steam at 100° for 5 minutes.

A wash in an open-width washing machine gives a nylon carpet whose fibre type labelled as pale-dyeable is virtually colourless while the fibre type labelled normal-dyeable has been dyed an orange-red shade and the fibre type labelled deep-dyeable has been dyed a brown shade.

EXAMPLE 18

A nylon carpet material which consists of a nylon fibre type labelled normal-dyeable, a nylon fibre type labelled deep-dyeable and a nylon fibre type labelled pale-dyeable with acid dyes and has a weight of 535 g per square meter is continuously prewetted in a liquor which contains per liter 1 g of the reaction product of 1 mol of nonylphenol with 9 mols of ethylene oxide, and is then suction-extracted down to a residual moisture content of 100 percent by weight.

In a foaming device (mixer) the following aqueous liquor is used to prepare a dyefoam whose degree of foaming is 1:8.

Per liter 1.2 g of the yellow dye of the formula (9), 0.6 g of the red dye of the formula (10), 0.75 g of the blue dye of the formula (12), 1 g of a foam-stabiliser mixture of the diethanolamide of coconut fatty acid/nonylphenol polyglycol(11) ether and sodium lauryltriglycol ether sulfate, 1 g of the siloxanoxyalkylene copolymer of the formula

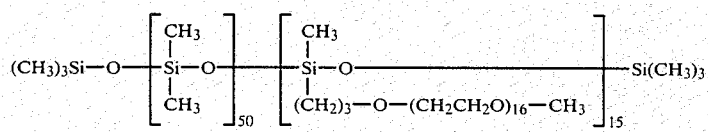

0.5 g of a water-softening agent based on polyphosphate, and acetic acid for bringing the liquor to pH 4.5.

This foam is then applied from a vessel which contains the foam and has an adjustable doctor for setting the desired foam thickness, via an applicator roll by means of a slide, to the pile side of the carpet running through the dyeing unit at a speed of 9 m/minute. The foam layer is 8 mm thick. The dyefoam level is 140 to 170%.

The carpet then passes via a transport roll into a steamer (5 minutes at 100°, saturated steam), where the foam foams up slightly and then collapses. Afterwards the carpet is sprayed down with water at about 80°, is then suction-extracted and is dried on a sieve drum dryer at 100° to 130°.

The carpet material obtained has a pattern which is rich in contrast and in which the nylon fibre type labelled as pale-dyeable is virtually colourless while the fibre type labelled as normal-dyeable has been dyed an orange-red shade and the fibre type labelled as deep-dyeable has been dyed a brown shade.

EXAMPLE 19

10 parts of a nylon carpet material made of a fibre type which is labelled normal-dyeable, a fibre type which is labelled deep-dyeable and a fibre type which is labelled pale-dyeable are dyed in 500 parts of an aqueous liquor which contains per liter 1.5 g of ammonium acetate and 1.5% of a non-ionic levelling assistant described in more detail in Example 15 and which is adjusted to pH 5.5 by means of 80% acetic acid. The dyes used are 0.24% of the yellow dye of the formula (9) and 0.2% of the blue dye of the formula (12) of Example 15, where the quantities are based on weight of fibre. The dyeing liquor is maintained at room temperature for 10 minutes and is then heated to 96° in the course of 45 minutes. Dyeing is carried out at 96° for 60 minutes. The liquor is then allowed to cool down to 70°, and the dyed nylon carpet material is taken out of the liquor and conventionally rinsed and dried. This gives a carpet material with a pattern which is rich in contrast and in which the fibre type labelled as pale-dyeable is virtually colourless while the fibre type labelled as normal-dyeable has been dyed in greenish yellow shades and the fibre type labelled as deep-dyeable has been dyed in a deep green shade.

EXAMPLE 20

10 parts of a nylon carpet material made of a nylon fibre type labelled as normal-dyeable, a nylon fibre type labelled as deep-dyeable and a nylon fibre type labelled as pale-dyeable with acid dyes are dyed in 500 parts of an aqueous liquor which contains per liter 1 g of ammonium acetate and 1.5% of a non-ionic levelling assistant described in more detail in Example 15 and which is adjusted to pH 4.5 by means of 80% acetic acid. The dyestuff used is 0.25% of the blue dye of the formula (12) of Example 15, where the quantity is based on weight of fibre. The dyeing liquor is maintained at room temperature for 20 minutes and is then heated to 70° in the course of 45 minutes. Dyeing is carried out at 70° for 60 minutes. The dyed nylon carpet material is then taken out of the dyebath and is conventionally rinsed and dried. This gives a pattern on the nylon carpet material which is rich in contrast and in which the fibre type labelled pale-dyeable is virtually colourless while the fibre type labelled normal-dyeable has been dyed in a pale blue shade and the fibre type labelled deep-dyeable has been dyed in a deep blue shade. The dyeings have generally good fastness properties.

The procedure described above is repeated using, in place of the 0.2% of the blue dye of the formula (12), 0.25% of the blue dye mixture which consists of 90 parts of the dye of the formula

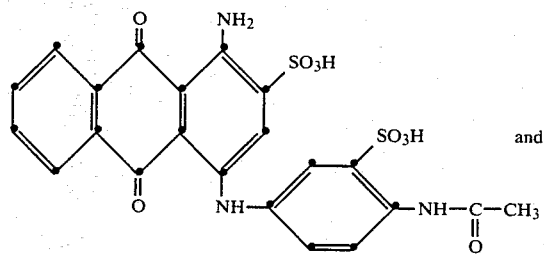

(15)

and 10 parts of the dye of the formula

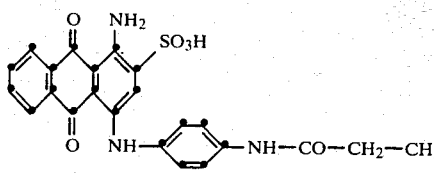

(16)

A nylon carpet material which has likewise been dyed in the way described above is obtained.

EXAMPLE 21

10 parts of a nylon carpet material made of a nylon fibre type labelled as normal-dyeable, a nylon fibre type labelled as deep-dyeable and a nylon fibre type labelled as pale-dyeable with acid dyes are dyed in 500 parts of an aqueous liquor which contains per liter 1 g of ammonium acetate and 1.5% of a non-ionic levelling assistant described in more detail in Example 15, and which is adjusted to pH 4.5 by means of 80% acetic acid. The dyestuffs used are 0.24% of the yellow dye of the formula (9), 0.12% of the red dye of the formula (10) of Example 15 and 0.2% of the blue dye of the formula

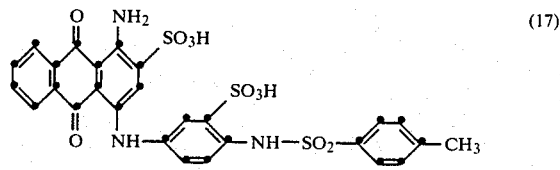

(17)

where the quantities are based on weight of fibre. The dye liquor is maintained at room temperature for 20 minutes and is then heated to 70° in the course of 45 minutes. Dyeing is carried out at 70° for 60 minutes. The dyed nylon carpet material is then taken out of the liquor and is conventionally rinsed and dried. This gives a pattern on the nylon carpet material which is rich in contrast and in which the fibre type labelled as pale-dyeable is virtually colourless while the fibre type labelled as normal-dyeable has been dyed an orange-red shade and the fibre type labelled as deep-dyeable has been dyed a brown shade. The dyeings have generally good fastness properties.

The procedure described above is repeated using, in place of the 0.2% of the blue dye of the formula (17), the dyes or dye mixtures given in Table 2 below. A nylon carpet material dyed as described above is obtained.

TABLE 2
| Example | Dye | Amount |
|---------|-----|--------|
| 22 | 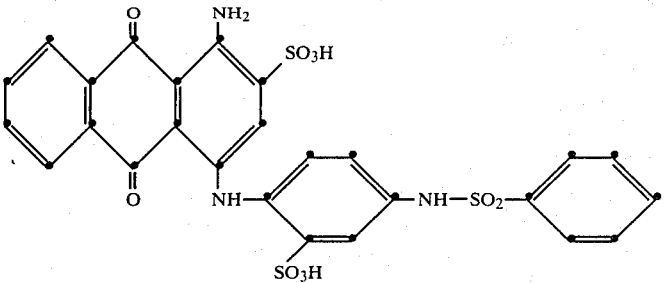 | 0.125% |
| 23 | 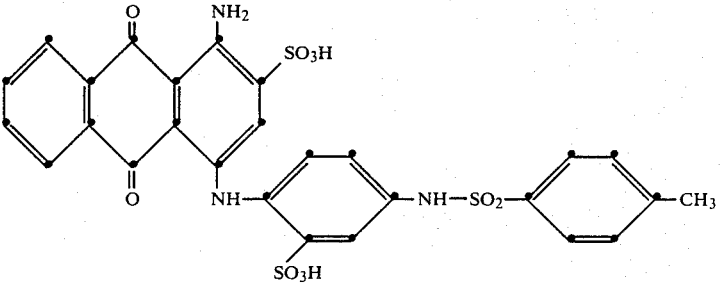 | 0.1% |
| 24 | 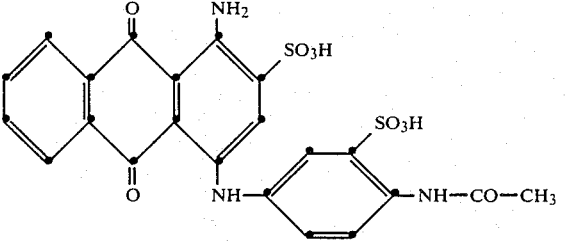 | 0.2% |
| 25 | 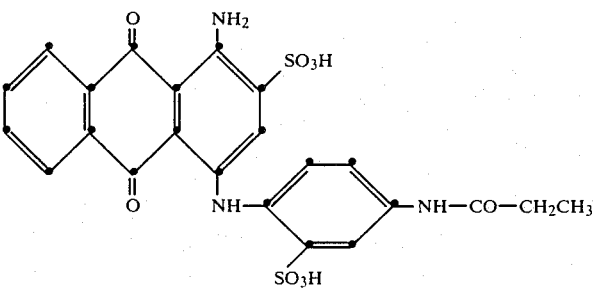 | 0.15% |
| 26 | 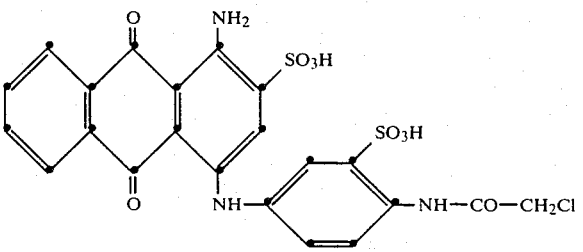 | 0.2% |

TABLE 2-continued

| Example | Dye | Amount |
|---|---|---|
| 27 | 1-amino-4-[(4'-acrylamido-2'-sulfo)phenylamino]anthraquinone-2-sulfonic acid (anthraquinone with 1-NH₂, 2-SO₃H, 4-NH–C₆H₃(SO₃H)–NH–CO–CH=CH₂) | 0.15% |
| 28 | A mixture of 90 parts of the dye (anthraquinone with 1-NH₂, 2-SO₃H, 4-NH–C₆H₃(SO₃H)–NH–CO–CH₃) and 10 parts of the dye (anthraquinone with 1-NH₂, 2-SO₃H, 4-NH–C₆H₄–NH–CO–CH₂–CH₃) | 0.3% |
| 29 | A mixture of 85 parts of the dye (anthraquinone with 1-NH₂, 2-SO₃H, 4-NH–C₆H₃(SO₃H)–NH–SO₂–C₆H₅) and 15 parts of the dye (anthraquinone with 1-NH₂, 2-SO₃H, 4-NH–C₆H₄–NH–CO–CH₂–CH₃) | 0.3% |

TABLE 2-continued
| Example | Dye | Amount |
|---------|-----|--------|
| 30 | 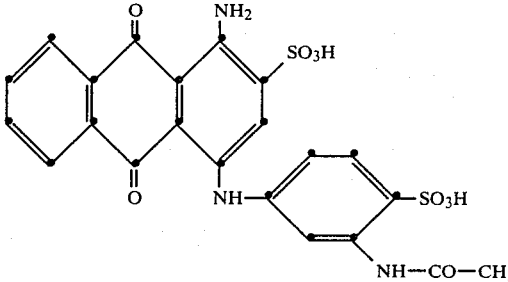 | 0.25% |
| 31 | 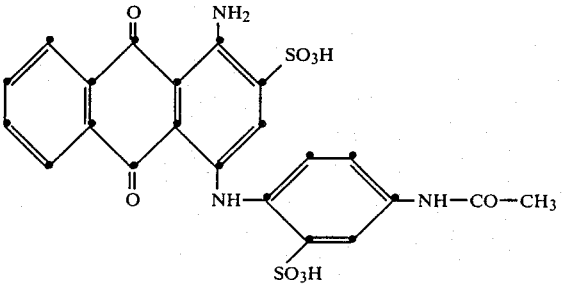 | 0.2% |
| 32 | 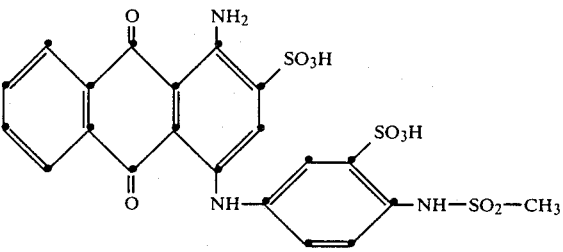 | 0.15% |
| 33 | 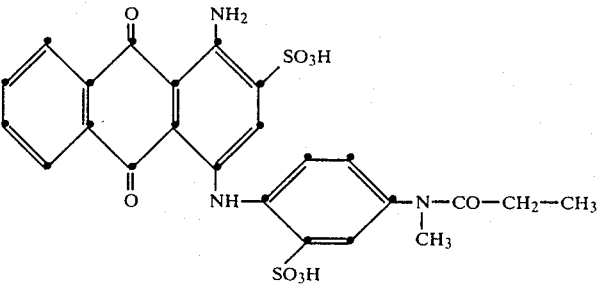 | 0.3% |
| 34 | 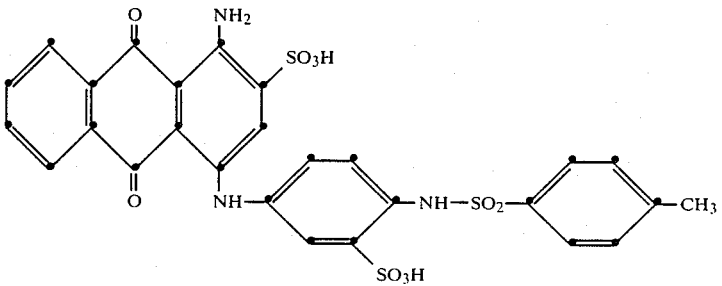 | 0.18% |

TABLE 2-continued

| Example | Dye | Amount |
|---|---|---|
| 35 | [anthraquinone dye structure with NH2, SO3H, NH-phenyl-NH-CO-CH2CH3, SO3H] | 0.2% |
| 36 | [anthraquinone dye structure with NH2, SO3H, NH-phenyl-SO3H, NH-SO2-phenyl] | 0.18% |
| 37 | [anthraquinone dye structure with NH2, SO3H, NH-phenyl-NH-CO-CH2CH2Cl, SO3H] | 0.2% |
| 38 | [anthraquinone dye structure with NH2, SO3H, NH-phenyl-NH-CO-CH2CH2Br, SO3H] | 0.18% |

EXAMPLE 39

10 parts of a nylon carpet material made of a nylon fibre type labelled as normal-dyeable, a nylon fibre type labelled as deep-dyeable and a nylon fibre type labelled as pale-dyeable with acid dyes are dyed in 500 parts of an aqueous liquor which contains per liter 1 g of ammonium acetate and 1.5% of a non-ionic levelling assistant based on a polyethoxylated $C_{20-22}$-fatty amine and which is adjusted to pH 4.5 by means of 80% acetic acid. The dye used is 0.15% of the blue dye of the formula 12

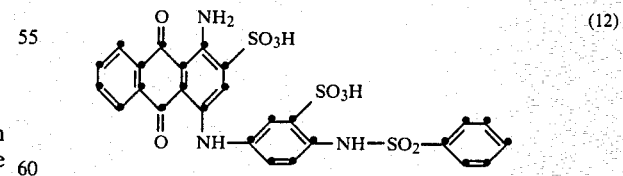
(12)

where the quantity is based on weight of fibre. The dyeing liquor is held at room temperature for 20 minutes and is then heated to 70° in the course of 45 minutes. Dyeing is carried out at 70° for 60 minutes. The dyed nylon carpet material is then taken out of the liquor and conventionally rinsed and dried. This gives a pattern on the nylon carpet material which is rich in contrast and in which the fibre type labelled as pale-dyeable is virtually colourless while the normal-dyeable fibre type has been dyed a blue shade and the fibre type labelled as deep-dyeable has been dyed a dark blue shade. The dyeings have generally good fastness properties.

EXAMPLE 40

The procedure described in Example 39 is repeated using as dye a mixture of 0.15% of the blue dye of the formula (12) and 0.24% of the yellow dye of the formula (9)

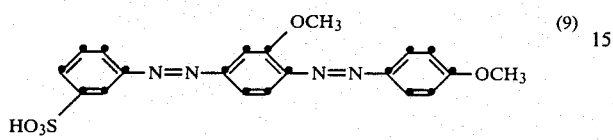

A pattern rich in contrast in a pale yellowish green to dark green shade is obtained on the nylon carpet material.

EXAMPLE 41

10 parts of a nylon carpet material made of a nylon fibre type labelled normal-dyeable, a nylon fibre type labelled deep-dyeable and a nylon fibre type labelled pale-dyeable with acid dyes are dyed in 500 parts of an aqueous liquor which contains per liter 1 g of ammonium acetate and 1.5% of a non-ionic levelling assistant based on a polyethoxylated $C_{20-22}$-fatty amine and which is adjusted to pH 4.5 by means of 80% acetic acid. The dyes used are 0.15% of the blue dye of the formula (12) and 0.12% of the red dye of the formula (10), where the quantities are based on weight of fibre. The dyeing liquor is held at room temperature for 20 minutes and is then heated to 70° in the course of 45 minutes. Dyeing is carried out at 70° for 60 minutes. The dyed nylon carpet material is then taken out of the liquor and conventionally rinsed and dried. This gives a pattern on the nylon carpet material which is rich in contrast in a pale bluish red to deep violet shade.

What is claimed is:

1. A process for the differential dyeing of polyamide fibers or mixtures of polyamide fibers which have components of different dyeability, comprising the step of applying to said fibers an aqueous liquor which contains a disulfo dye of the formula

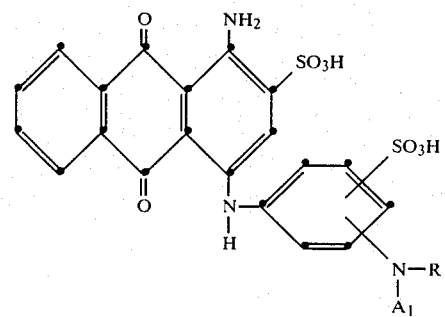

in which $A_1$ is hydrogen or $C_{1-4}$-alkyl and R is $C_{2-5}$-alkanoyl, $C_{3-6}$-alkenoyl, phenoxycarbonyl, $C_{1-4}$-alkylsulfonyl or phenylsulfonyl, the alkyl, alkenyl, alkoxy, phenoxy or phenyl moieties of which are unsubstituted or substituted.

2. The process of claim 1, wherein R is acetyl, chloroacetyl, propionyl, β-chloropropionyl, β-bromopropionyl, acryloyl, phenoxycarbonyl, methylsulfonyl, phenylsulfonyl or methylphenylsulfonyl.

3. The process of claim 1, wherein the aqueous liquor further contains a monosulfo anthraquinone dye.

4. The process of claim 3, wherein the monosulfo anthraquinone dye is of the formula

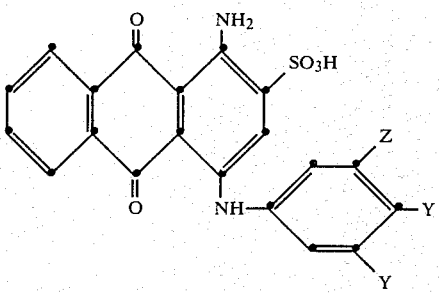

in which one Y is hydrogen or methyl and the other Y is $C_{2-4}$-alkanoylamino or $C_{2-4}$-hydroxyalkylsulfamoyl, and Z is hydrogen or methyl.

5. The process of claim 4, wherein the disulfo:monosulfo dye ratio is in the range of 99:1 to 70:30.

6. The process of claim 5 wherein said ratio is in the range of 90:10 to 80:20.

7. The process of claim 2, wherein

is in the 3- or 4 position and $A_1$ is hydrogen, methyl or ethyl.

8. The process of claim 7, wherein

is in the 4-position and $A_1$ is hydrogen or methyl.

9. The process of claim 8, wherein R is acetyl, chloroacetyl, propionyl, β-chloropropionyl, β-bromopropionyl, acryloyl, methylsulfonyl, phenylsulfonyl or p-methylphenylsulfonyl.

10. The process of claim 9, wherein a mixture of dyes of the formulae

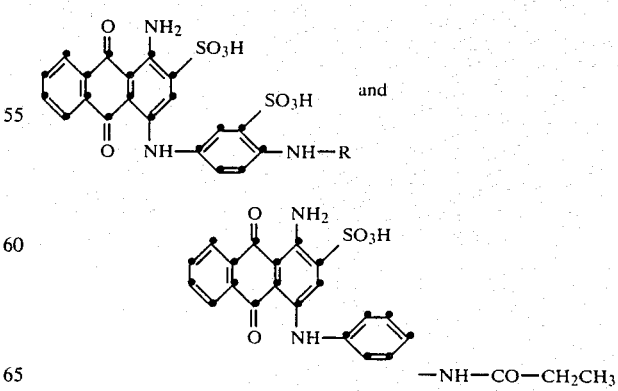

is applied, wherein, R is acetyl, p-methylphenylsulfonyl or phenylsulfonyl.

11. The process of claim 1, wherein $A_1$ is hydrogen.

12. The process of claim 1, wherein R is $C_{1-4}$-alkylsulfonyl or phenylsulfonyl which is unsubstituted or substituted in the phenyl moiety.

13. The process of claim 9, wherein $A_1$ is hydrogen and R is phenylsulfonyl or p-methylphenylsulfonyl.

14. The process of claim 7, wherein the aqueous liquor further contains an acid dye suitable for normal polyamide fibers.

15. The process of claim 14, wherein the acid dye is at least one yellow dye and/or at least one red dye.

16. The process of claim 15, wherein the yellow acid dye is of the formula

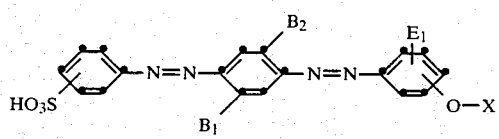

in which $B_1$, $B_2$ and $E_1$ are hydrogen, $C_{1-4}$-alkyl or $C_{1-4}$-alkoxy, and X is $C_{1-4}$-alkyl or $C_{2-4}$-hydroxyalkyl.

17. The process of claim 15, wherein the red acid dye is of the formula

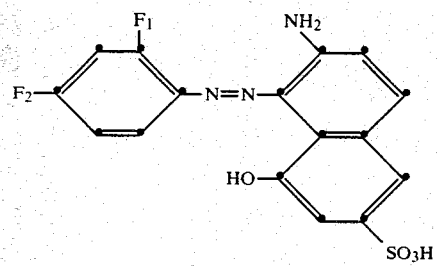

in which $F_1$ is hydrogen, substituted or unsubstituted $C_{1-4}$-alkyl,

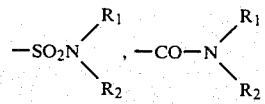

or $-SO_2R_3$ in which $R_2$ is $C_{1-4}$-alkyl, $R_2$ is substituted or unsubstituted $C_{5-7}$-cycloalkyl or substituted or unsubstituted phenyl, $R_3$ is substituted or unsubstituted phenyl or substituted or unsubstituted phenoxy, and $F_2$ is hydrogen, halogen, $C_{2-4}$-alkoxycarbonylamino, $C_{1-4}$-alkylsulfonylamino or substituted or unsubstituted phenylsulfonylamino.

18. The process of claim 17, wherein $F_1$ is trifluoromethyl, N-methyl-N-cyclohexylsulfamoyl or N-ethyl-N-phenylsulfamoyl, and $F_2$ is hydrogen, chlorine or acetylamino.

19. The process of claim 16, wherein the aqueous liquor containing at least one dye as defined in claim 16 and at least one dye of the formula

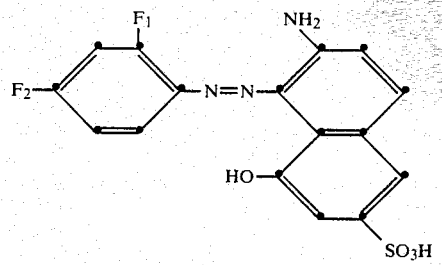

in which $F_1$ is trifluoromethyl, N-methyl-N-cyclohexylsulfamoyl or N-ethyl-N-phenylsulfamoyl and $F_2$ is hydrogen, chlorine or acetylamino.

20. The process of claim 14, wherein the aqueous liquor contains a dye of the formula

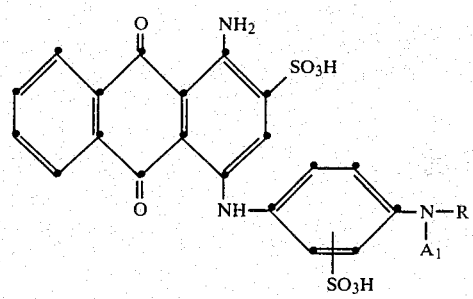

in which $A_1$ is hydrogen or methyl and R is acetyl, chloroacetyl, propionyl, β-chloropropionyl, β-bromopropionyl, acryloyl, methylsulfonyl, phenylsulfonyl or p-methylphenylsulfonyl, or a mixture of said dye in which $A_1$ is hydrogen and R is acetyl or phenylsulfonyl, with a dye of the formula

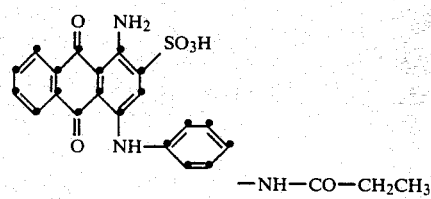

together with the dye of the formula

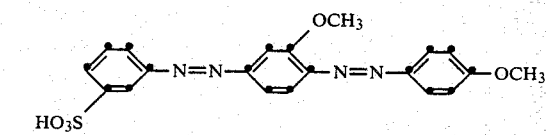

and the dye of the formula

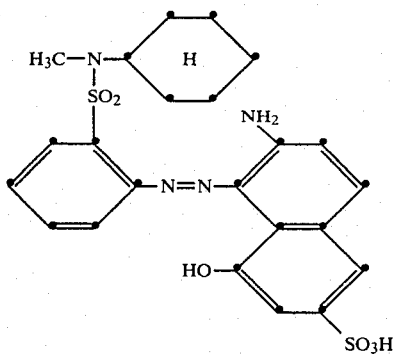

21. The process of claim 1, wherein the aqueous liquor is applied at a temperature between 50° and 100° C.

22. The process of claim 21, wherein the aqueous liquor is applied at 70° to 96° C.

23. The aqueous dye liquor of claim 1.

24. The textile material, dyed by the process of claim 1.

25. The dyed material of claim 24 which is nylon carpet.

26. A dye of the formula

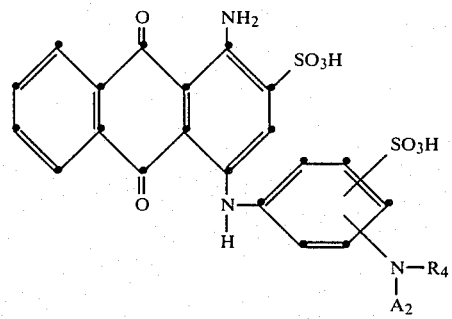

in which $A_2$ is hydrogen or $C_{1-4}$-alkyl and $R_4$ is a $C_{1-4}$-alkylsulfonyl or phenylsulfonyl which is unsubstituted or substituted in the phenyl moiety by $C_{1-4}$-alkyl.

27. A dye of claim 26, in which $A_2$ is hydrogen.

28. A dye of claim 26, in which $R_4$ is phenylsulfonyl or methylphenylsulfonyl.

29. The dye of claim 28, in which

is 4-phenylsulfonylamino and —SO$_3$H is in the 3-position.

30. The dye of claim 28, in which

is 4-phenylsulfonylamino and —SO$_3$H is in the 2-position.

31. A process for preparing a dye of claim 26, which comprises acylating a compound of the formula

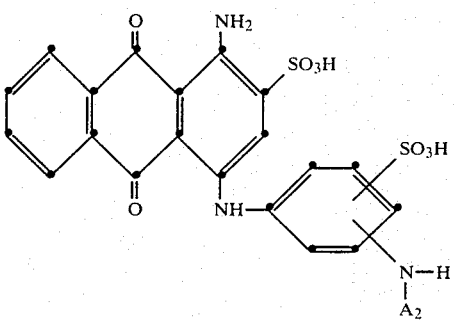

in which $A_2$ is as defined in claim 26, with a compound which introduces the radical $R_4$.

32. A process for dyeing or printing organic material which comprisies applying to said material a dye of claim 26.

33. The process of claim 32, wherein the organic material is polyamide fiber.

* * * * *

UNITED STATES PATENT AND TRADEMARK OFFICE
CERTIFICATE OF CORRECTION

PATENT NO. : 4,514,187

DATED : April 30,1985

INVENTOR(S) : Hans U. Schutz, Helmut Raisin, Th··s Bouwknegt.

It is certified that error appears in the above-identified patent and that said Letters Patent is hereby corrected as shown below:

Column 3 the dye of formula (3) should read--

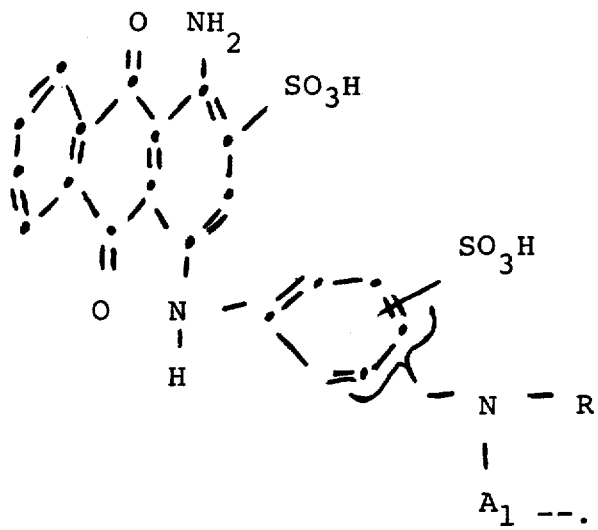

--.

UNITED STATES PATENT AND TRADEMARK OFFICE
CERTIFICATE OF CORRECTION

PATENT NO. : 4,514,187

DATED : April 30, 1985

INVENTOR(S) : Hans U. Schutz, Helmut Raisin, Th··s Bouwknegt.

It is certified that error appears in the above-identified patent and that said Letters Patent is hereby corrected as shown below:

Column 3 the dye of formula (6) should read--

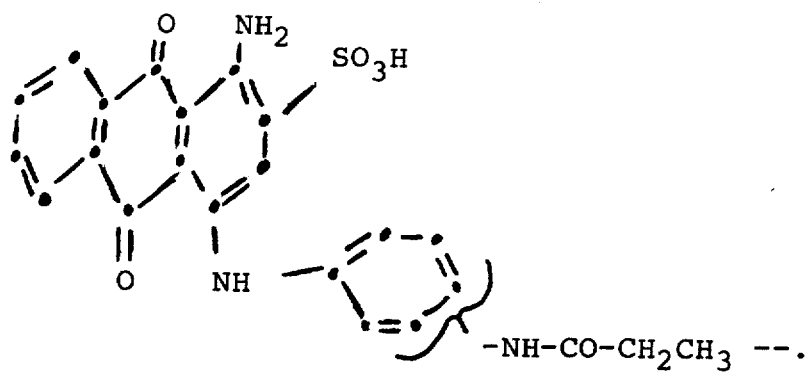

UNITED STATES PATENT AND TRADEMARK OFFICE
CERTIFICATE OF CORRECTION

PATENT NO. : 4,514,187  Page 3 of 4

DATED : April 30, 1985

INVENTOR(S) : Hans U. Schutz, Helmut Raisin, Th··s Bouwknegt.

It is certified that error appears in the above-identified patent and that said Letters Patent is hereby corrected as shown below:

Claim 1 line 66 in column 27 should read--
the alkyl, alkenyl, phenoxy, or phenyl moieties of which are unsubstituted or substituted.

Column 28, Claim 10, second formula should read--

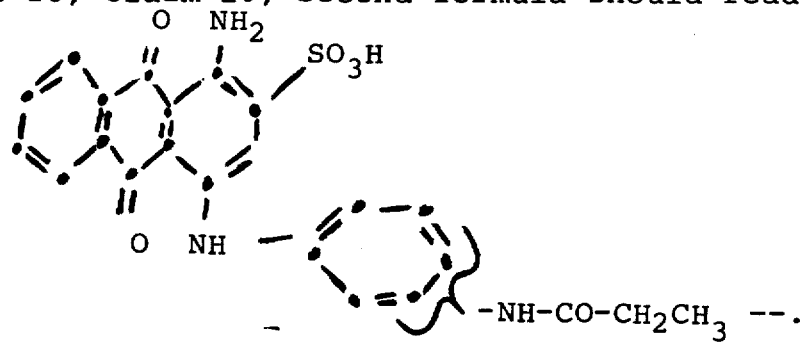

UNITED STATES PATENT AND TRADEMARK OFFICE
CERTIFICATE OF CORRECTION

PATENT NO. : 4,514,187

DATED : April 30, 1985

INVENTOR(S) : Hans U. Schutz, Helmut Raisin, Th··s Bouwknegt.

It is certified that error appears in the above-identified patent and that said Letters Patent is hereby corrected as shown below:

Column 30, Claim 20, second formula should read--

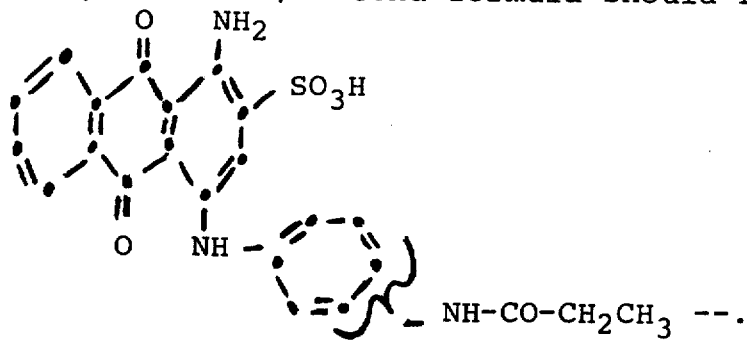

Signed and Sealed this

Eighteenth Day of February 1986

[SEAL]

Attest:

DONALD J. QUIGG

Attesting Officer

Commissioner of Patents and Trademarks